No. 611,430. Patented Sept. 27, 1898.
R. S. HILL.
VALVE GEAR FOR ENGINES.
(Application filed Nov. 29, 1897.)

(No Model.) 2 Sheets—Sheet 1.

WITNESSES
W. R. Bradford
Harry Moule

INVENTOR
Robert S. Hill
By D. W. Bradford
Attorney.

No. 611,430. Patented Sept. 27, 1898.
R. S. HILL.
VALVE GEAR FOR ENGINES.
(Application filed Nov. 29, 1897.)
(No Model.) 2 Sheets—Sheet 2.
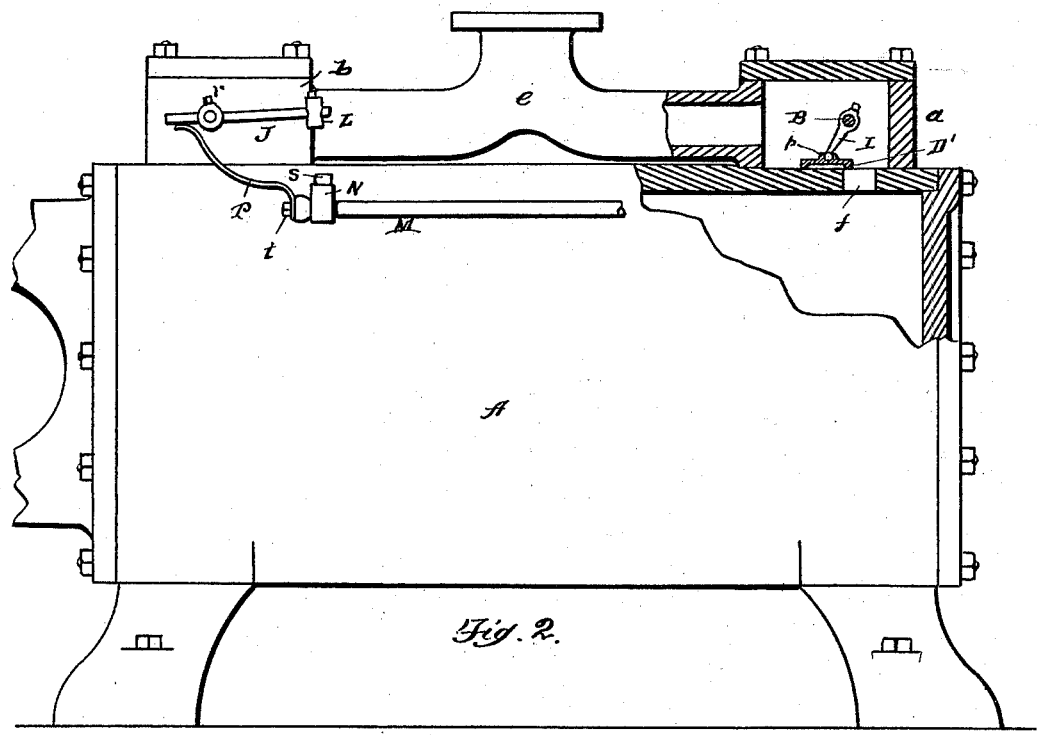
Fig. 2.
Fig. 3.
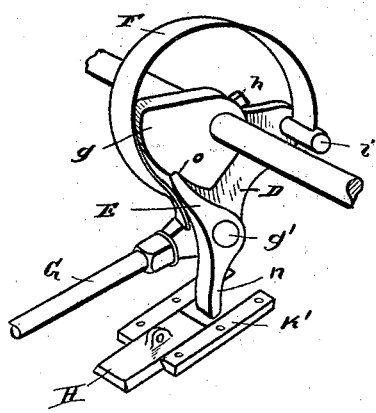
WITNESSES
W. R. Bradford
Harry Moule
INVENTOR
Robert S. Hill
By D. H. Bradford
Attorney.
THE NORRIS PETERS CO., PHOTO-LITHO., WASHINGTON, D. C.

UNITED STATES PATENT OFFICE.

ROBERT S. HILL, OF DETROIT, MICHIGAN.

VALVE-GEAR FOR ENGINES.

SPECIFICATION forming part of Letters Patent No. 611,430, dated September 27, 1898.

Application filed November 29, 1897. Serial No. 660,065. (No model.)

*To all whom it may concern:*

Be it known that I, ROBERT S. HILL, a citizen of the United States, residing at Detroit, in the county of Wayne and State of Michigan, have invented certain new and useful Improvements in Valve-Gear for Steam-Engines; and I do hereby declare the following to be a full, clear, and exact description of the invention, such as will enable others skilled in the art to which it appertains to make and use the same, reference being had to the accompanying drawings, forming a part of this specification.

This invention relates to valves for steam-engines, and has for its object to provide improvements in the construction of a slide-valve and the general arrangement and operation of the valve-operating parts, whereby said valve is balanced and the engine generally rendered more economical and efficient.

A further object of this invention is to provide means that will insure a quick opening and a positive cut-off of the valves at any point within the limits of the piston-stroke to be controlled by the governor; and it consists in the general construction and arrangement of the parts to be hereinafter described and claimed.

Figure 1:
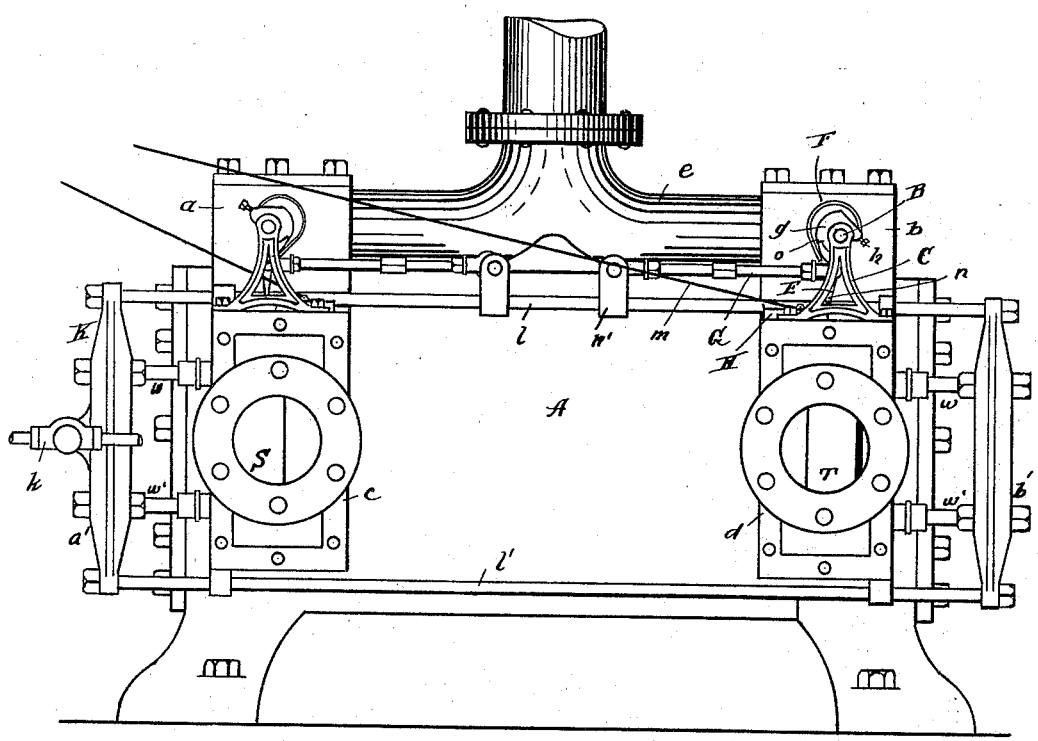
Figure 4:
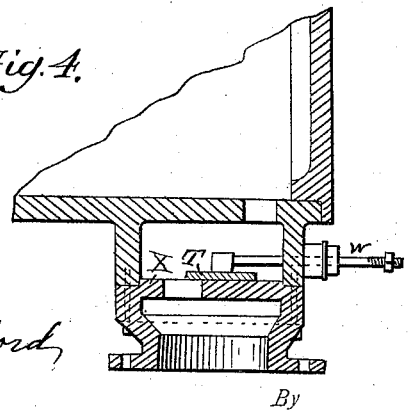

In the accompanying drawings, Figure 1 is a side elevation of the cylinder of a stationary slide-valve engine embodying my improvements. Fig. 2 is a rear elevation, partially in section, showing the concaved valve and its connections and also illustrating the rocker-arm and flat spring by means of which the valve is limited in its movement and closed. Fig. 3 is a perspective view, somewhat enlarged, illustrating the trip mechanism. Fig. 4 is a horizontal section of one of the exhaust-steam chests, illustrating the diaphragm and its relation to the port and valve.

Like letters of reference refer to corresponding parts throughout the various figures.

In connection with my improvements I prefer to employ independent ports for both the supply and exhaust, and the valves to be employed in connection with the ports for closing the same I construct in the form of flat plates concave upon their under surface. This construction may be applied to both supply and exhaust valves, if desired, although the purpose for which it is designed, to be hereinafter more fully described, is particularly adapted to the supply-ports.

A indicates the cylinder to which my improvements are applied and which is preferably constructed with flattened surfaces upon two sides to receive the supply-steam chests *a b* and exhaust-chests *c d*. These supply-chests are united by means of the T-joint *e*, which is provided with a suitable flange to connect with the supply-steam pipe and lead the live steam into both chests.

In Fig. 2 the cylinder-port is indicated at *f* and is preferably constructed long and narrow, extending across the cylinder adjacent to one side of the chest, so that the valve will have sufficient room to slide thereover in its cut-off and opening movements without necessitating a large steam-chest. The construction of the mechanism in connection with both steam-chests is substantially identical, with the exception that one is right and the other left in its operation, and it is thought that the description of one will suffice for both.

B represents the rock-shaft or valve-stem extending through the end walls of the steam-chest, where they are packed in the usual manner to render the joints steam-tight and at the same time permit a free rocking movement therein. The forward end of this shaft is supported and journaled in the bracket C, which rests upon the upper end of the exhaust-steam chest, and between this bracket and the end wall of the chest there is mounted upon the valve-stem or shaft the ratchet *g*, made rigid therewith by means of the set-screw *h*. Adjacent to this ratchet and loosely mounted upon the same shaft there is a rocker-arm D, at the lower end of which there is pivoted the dog E, having its upper end arranged to rest against and engage with the ratchet as the arm is operated. The nose of this dog is held in engagement with the ratchet by means of the flat spring F, secured to the lateral extension *i* upon the arm D and carried upward and over the shaft, where its free end is turned downward and made to bear against the outer face of the dog. Upon the pivot or bolt *g'*, which serves to secure the dog and also form a pivot therefor, the end of the connecting-link G is pivoted, which receives its motion through the medium of the eccentric, (not shown,) eccentric-rod *k*, frame K, and the intermediate connections, to be hereinafter more fully described.

Upon the upper face or end of the exhaust-steam chest there is slidingly mounted the trip-block H, connected and operated by means of the governor through the medium of the rod *m*. This block lies in the dovetailed ways K' and is arranged to slide in the path of the tail *n* of the dog upon that side lying toward the center of the cylinder, so that as the frame K reciprocates, causing the yoke-rods *l l'* to move in their bearings at the ends of the cylinder, the link G, which has its outer end adjustably connected to the upper yoke-rod *l* by means of the block *n'*, actuates the rock-arm D around the valve-stem, upon which it is loosely hung, thus bringing the tail of the dog into contact with the trip-block at each stroke of the engine, and as the dog is tripped the ratchet is released from engagement therewith, thus permitting the valve-stem or rock-shaft to be quickly returned to close the valve. The opening of the valve is accomplished by the engagement with the nose of the dog with the notch *o*, which causes the rocking shaft to be actuated in a direction with the rock-arm D, and which has mounted rigidly thereon the levers I, the lower ends of which terminate in a T to engage between the upwardly-extending lugs *p* upon the upper surface of the valve. By this means it will be observed that the rocking action of the valve-stem or rock-shaft is transmitted through the lever I to the valve, where it is converted into a reciprocating motion.

The cut-off movement of the valve is produced by the mechanism illustrated at the back of the cylinder (shown in Fig. 2) and consists of the rocking lever J, mounted upon the end of the valve-stem, to which it is secured by means of the set-screw *r*. This lever has adjustably mounted upon one end thereof the weight or block L, adapted to be moved along one arm of the lever and to be secured thereto in its adjusted position, and beneath this adjustable block and also adjustably mounted upon the horizontal rod M there is a buffer-block N, provided with a recess in its upper end to receive and hold the rubber buffer *s*, which acts to limit the return movement of the rock-lever as the port is suddenly closed or cut off. In a great majority of cases this weight is found sufficient to actuate the lever after the dog has been tripped, and, as will be seen, may be made of any desired weight and adjusted to any suitable position upon the lever to suit the emergencies of the case. In addition to this, however, I prefer to employ a flat spring P, bent in the form of a bow, with its lower end secured to the end of the horizontal bar M by means of the stud *t* and having its upper or free end resting snugly against the under side of the short arm of the lever which lies on that side of the valve-stem opposed to the weight above described. It will therefore be obvious that the instant the tail of the dog engages the trip-block and the nose is thrown out of engagement with the notch upon the ratchet the weight and spring at the opposite end of the chest will immediately cause the valve to be returned to its closed condition.

The exhaust-valves S T (seen in Fig. 1) are preferably composed of a single flat plate, to which the short stems *w w'* are secured. The stems reciprocate through suitable packing-boxes arranged in the outer wall of the chest and are connected at their outer ends to the yokes *a' b'* of the frame K, receiving their motion directly from the eccentric and eccentric-rod. The cover of this exhaust-valve chest is provided with a diaphragm X, in which the exhaust-port is located, and the inner surface of this diaphragm is dressed to receive the valve and to furnish a steam-tight joint therewith, so that when the pressure of steam is admitted within the cylinder it acts to securely hold the exhaust-valve into engagement with its seat, thereby preventing leakage and undesirable loss of steam.

From the foregoing the operation of my invention will be clearly understood. Assuming the parts to occupy their proper relative positions and the eccentric moving in a direction to cause the frame K to move forward, the dog at the right end of the cylinder will have engaged its ratchet, causing it to be rotated and the supply-valve to be opened, thus admitting steam into the right-hand end of the cylinder, at the same time the dog at the opposite end sliding back upon its ratchet-block to a position where its nose engages with the notch therein preparatory for the reverse motion of the eccentric and frame. While the frame is being actuated toward the left the exhaust-valve S is being opened and the live steam admitted into the steam-chest at the right is permitted to enter the cylinder, whereupon the piston is caused to move forward or toward the left. As soon as the eccentric has carried the frame K a sufficient distance to the left to bring the tail of the dog into engagement with the tripping-block the nose is thrown out of engagement with the notch in the ratchet, whereupon the rocking lever at the opposite end of the valve-stem immediately cuts off the inlet-port and the piston is continued by the expansion of the steam within that end of the cylinder. Just before the piston reaches its limit or throw and starts upon its return movement the eccentric reverses the movement of the frame and yoke-rods, causing the live-steam port at the left-hand end of the cylinder to be opened about the time the piston reverses its motion, and as the frame moves to the right the exhaust-valve T is opened, the valve S closed, and the dog carried along until its tail engages with the tripping-block, whereupon the supply-steam port is cut off and the remainder of the stroke actuated by expansion. Thus it will be seen that the reciprocations of the valve-actuating frame are transmitted to the supply and exhaust valves, and as they are all driven by a single eccentric the lead and points of release or exhaust are maintained equal for all points of cut-off.

In Fig. 1 I have shown the rods $m\ m'$ connecting with the tripping-blocks and having their opposite ends engaging with the governor. By this means it will be seen that the sliding tripping-blocks are controlled directly from the governor and the cut-off regulated in accordance with the speed thereof, thus economizing in the use of steam and maintaining a uniform speed in the engine.

In the use of the ordinary flat valve in connection with a single port the overlapping edge of the valve is usually brought to a vertical plane with the edge of the port when in its fully-opened condition, so that the valve may not be any larger or require any greater area than necessary to cover the port when the steam is cut off with a very slight overlap. This, with the fact that the valve lies flat upon its seat, has been found to be objectionable in that the steam-pressure while the valve is open, or nearly so, renders the movement of the valve very difficult, and it is with a view of overcoming this objection that the novel construction and arrangement of my improved valve has been developed.

Some slight changes may suggest themselves to the minds of those familiar with the art that would not materially affect the results, and I desire to have it understood that although I prefer the form and arrangement herein shown I do not limit myself thereto.

Having thus described my invention, what I claim is—

1. In a steam-engine, the combination of a cylinder having a steam-chest thereon and a port communicating therewith, a slide-valve adapted to cross the port, and to reciprocate within said steam-chest, a rock-shaft journaled within the walls of said steam-chest, levers secured to said rock-shaft, and loosely connected to said valves, a rock-lever upon one end of said valve-stem, a weight adjustably mounted upon the end of said lever, a spring secured at its lower end and having its upper end arranged to engage freely with the short end of said lever, whereby said valve is closed, a ratchet mounted upon the opposite end of said rock-shaft, a second lever secured upon said shaft, a dog pivotally secured to the free end of said second lever, and having its nose arranged to engage with said ratchet, a spring having one end secured to said second lever, and its opposite free end adapted, to bear against the nose of said dog, whereby it is held into engagement with said ratchet, means connecting said second lever with the eccentric-rod of said engine, and an adjustable tripping-block adapted to engage with the tail of said dog, substantially as described.

2. In a steam-engine, the combination with a cylinder of a pair of supply-steam chests, valve-stems arranged to journal within the walls of said chest and to extend therethrough, a frame consisting of yokes and yoke-rods adapted to reciprocate in the bearings at the ends of said cylinder, ratchets rigidly mounted upon said valve-stems, rocker-arms loosely journaled upon said valve-stems, dogs pivoted to the free ends of said rocker-arms, links adapted to connect said rocker-arms to one of said yoke-rods, said steam-chests having ports therethrough communicating with said cylinder, concaved slide-valves adapted to close said ports and to overlap the edges thereof when in their opened condition, whereby the steam is admitted below said valves, means connecting said valve-stems to said valves whereby the rotation thereof is transmitted to the valves in the form of a reciprocating motion, means for engaging said dogs whereby they are disengaged from said ratchets, and means for actuating said valves to cut off the steam-supply, substantially as described.

3. In a steam-engine, the combination of a cylinder having a steam-chest thereon and a port communicating therewith, a concaved slide-valve adapted to close the port and to reciprocate within said steam-chest, a rock-shaft journaled in the walls of said steam-chest, levers secured to said rock-shaft and loosely connected with said valve, a rock-lever upon one end of said valve-stem, a weight adjustably mounted upon one end of said lever, a flat spring secured at its lower end and having its upper end arranged to engage freely with the short end of said lever, whereby said valve is closed, and means for opening said valve whereby it is released, substantially as described.

4. In a steam-engine, the combination of a cylinder, independent exhaust and supply steam chests secured upon two sides of said cylinder, a frame comprising yokes and yoke-rods adapted to reciprocate in bearings at each end of said cylinder, caps having diaphragms arranged to cover said exhaust-steam chests, short stems arranged to reciprocate through the walls of said chest and to engage with the valves and yokes, said valves being adapted to seat upon that side of the diaphragms lying nearest the cylinders, whereby the steam-pressure causes said valves to snugly engage their seats, valve-stems extending through and journaled in the end walls of said supply-steam chests, ratchets rigidly mounted upon one end of said stems, rock-arms loosely journaled upon said shaft at one end and having their free ends pivotally linked to one of said yoke-rods, dogs pivoted to the lower free ends of said rock-arms, having their upper ends engaging with said ratchets and their lower ends extending downward to be actuated by a trip mechanism, tripping-blocks slidingly supported upon the cylinder adapted to engage within the paths of the lower ends of said dogs, a rock-lever secured upon the opposite end of said valve-stem, and means arranged to engage with said rock-lever whereby the valve is closed to cut off the steam-supply, substantially as described.

In testimony whereof I affix my signature in presence of two witnesses.

ROBERT S. HILL.

Witnesses:
HARRY MOULE,
W. R. BRADFORD.